INSTRUMENT LANDING SYSTEM

Filed Jan. 8, 1959 2 Sheets-Sheet 1

INVENTORS.
ERNEST G. PARKER
MARK A. KARPELES
BY RICHARD W. CRAINE
Robert T. Dunn
AGENT INVENTORS.
ERNEST G. PARKER
MARK A. KARPELES
RICHARD W. CRAINE
BY Robert T. Dunn
AGENT United States Patent Office 3,048,842

Patented Aug. 7, 1962

3,048,842

INSTRUMENT LANDING SYSTEM

Ernest G. Parker, Morristown, Mark A. Karpeles, West Orange, and Richard W. Craine, Passaic, N.J., assignors to International Telephone and Telegraph Corporation, Nutley, N.J., a corporation of Maryland Filed Jan. 8, 1959, Ser. No. 785,667

6 Claims. (Cl. 343—108)

Figure 1A:
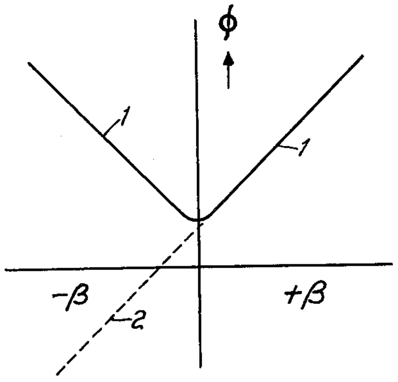

This invention relates to instrument landing systems and more particularly to such a system producing a continuous selection of different landing paths for a craft to follow over a range of elevation angles.

In the past, instrument landing systems known commonly as null type landing systems have been extensively employed. These null type systems generally consist of an array of essentially non-directional antenna elements producing radiation defining one landing path. This radiation usually consists of two high frequency radiation fields, each field being equally modulated by opposite phases of a modulation signal. Receiving equipment on board a craft detects these modulating signals and adds them. A null is produced when the craft is on the defined path.

In such prior systems a null is not produced when the craft is above or below the defined path, but rather an audio tone is produced which corresponds to the modulating signal. This audio tone is the same whether the craft is above or below the defined path and, consequently, the operator of the craft can not determine whether his craft is above or below the defined path. In other prior systems this problem has been solved by altering the modulation of the two high frequency radiation fields so that the detected modulations of opposite phases are not of equal amplitude at points equally above and below the defined path and by adding two more high frequency radiation fields defining the same path, each unequally modulated by opposite phases of a second modulation signal. As a result, the audio tone above the defined path is different from the tone below the defined path. For example, above the path, the tone will correspond to the first-mentioned modulating signal and below the path, the tone will correspond to the second modulating signal and both tones will be nulled when the craft is on the defined path.

Prior systems such as described above employing an array of antennas for creating the radiation fields defining the landing path, utilize ground reflection to create those fields and consequently they require the ground level and reflectivity to remain constant. If the weather condition should change the ground level and reflectivity, as often happens, compensations must be made or the path will be distorted.

Other prior instrument landing systems somewhat similar to those described above do not utilize ground reflection but rather avoid ground reflection as much as possible. These other prior systems employ highly directional antenna elements having negligible side lobes rather than the essentially non-directional elements employed in the first-mentioned prior systems. One limitation of systems employing highly directional antenna elements where ground reflection is to be avoided is that the carrier frequency must be considerably greater than the carrier frequency in the first-mentioned prior systems. For example, it is generally desired that the instrument landing system carrier frequency be around 300 to 1000 mc., but highly directional antenna elements having negligible side lobes operating within this range are difficult to produce.

A common limitation of all the mentioned prior systems is that only one useful path is defined or if more than one path is defined, those paths are at widely different elevation angles and no means are available for selecting paths therebetween. Another limitation of the first-mentioned prior systems is that ground level and reflectivity changes must be compensated for to provide a path not subject to change with weather conditions. Another limitation of the first mentioned systems is that two different modulation signals are required adding to the complexity of the systems and increasing the bandwidth required for operation.

It is the principal object of this invention to provide an instrument landing system having none of the limitations of the above mentioned prior systems.

It is another object to provide an instrument landing system by which a craft may select a landing path at any elevation angle between widely separated limits.

It is another object to provide such a system including an antenna array having no moving elements, the height of said array above the ground having no effect on the operation of the system.

It is another object to provide a glide path beacon antenna producing a modulated field of radiation, the phase of said modulation varying linearly with the absolute value of elevation angle and unaffected by ground level or reflectivity.

It is a feature of this invention to provide a glide path beacon radiating a modulated signal, $\Phi$ which is related to carrier frequency rate $W_c$, modulating frequency rate $W_m$, elevation angle $\beta$ and constants A and K in accordance with the expression $$\Phi=[1+A \sin (W_m t \pm 2.K\beta)] \sin W_c t$$

thereby providing modulated carrier signals whose modulation phase varies linearly with the absolute value of elevation angle.

It is another feature of this invention to form said beacon of a plurality of pairs of vertically disposed symmetrical antenna elements energized by double sidebands of a modulated carrier signal and to provide an antenna element energized by said carrier signal and located on the line of symmetry.

It is another feature to energize some of said pairs with the same double sideband signal attenuated different amounts and to energize one pair with a signal of opposite sign to said same signal and to energize another pair with carrier signal modulated in quadrature with said signal of opposite sign.

It is another feature that the distance between antennas of each of said plurality of pairs be different and that the ratio of some of these different distances to the distance between antennas of the closest spaced pair be an odd number, except the distance between antennas of the pair energized with said carrier signal modulated in quadrature.

It is a feature of one embodiment of this invention to employ five such pairs of antennas and to energize the most closely spaced pair with said signal of opposite sign and the next most closely spaced pair with said signal in quadrature.

Figure 2:
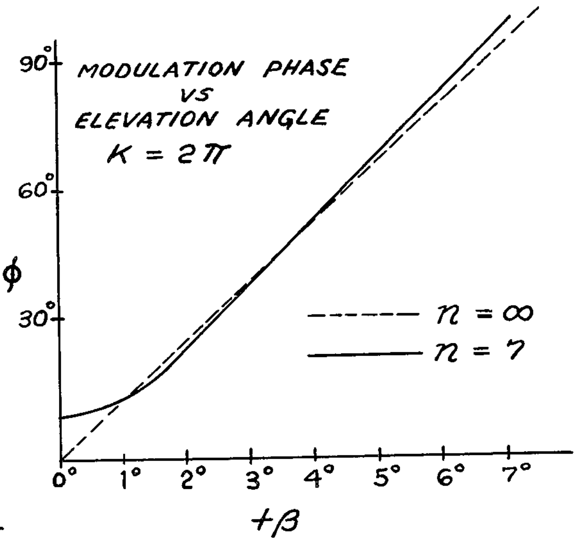
Figure 1B:
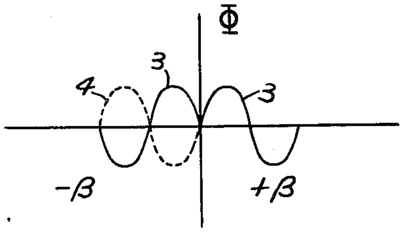
Figure 4:
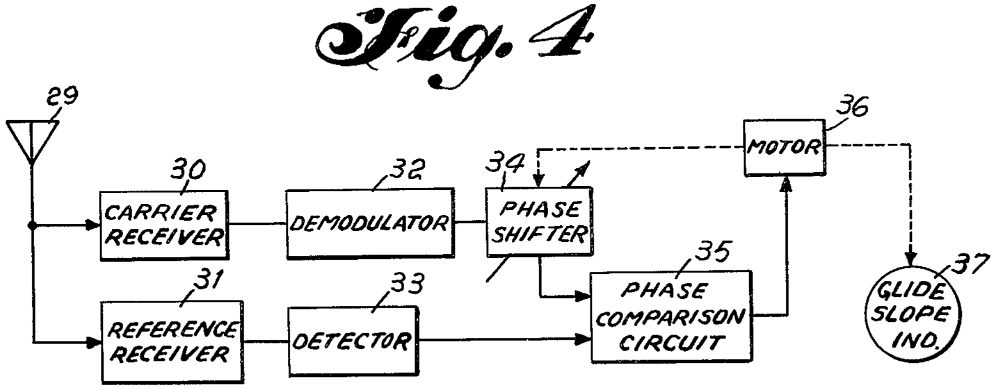
Figure 3:
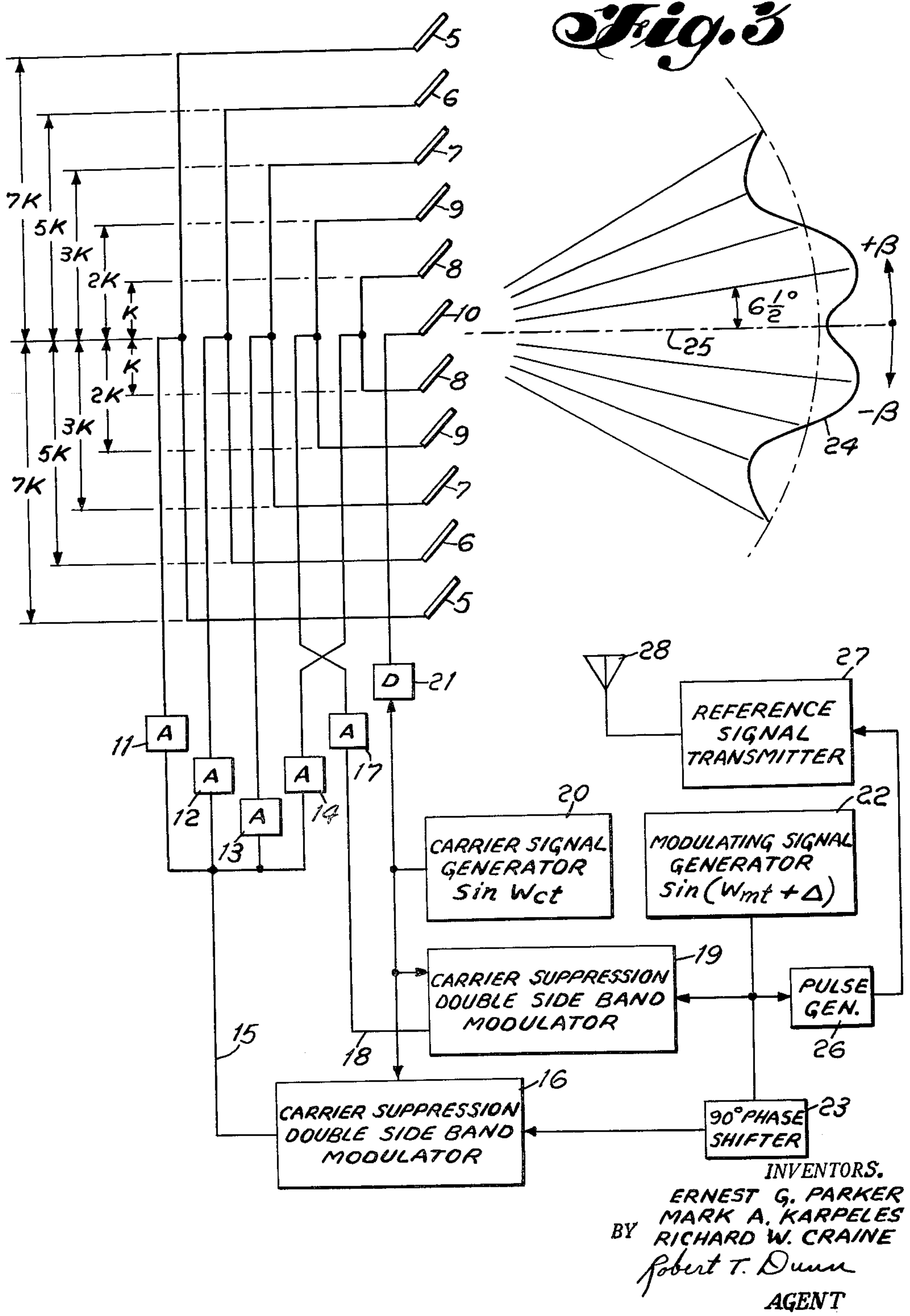

Other and further features and objects of this invention will be more apparent from the following description of embodiments of this invention taken in conjunction with the FIGS. 1, 2, 3 and 4, in which:

FIG. 1*a* is a plot of modulation phase $\phi$ versus positive and negative elevation angles $\beta$; and FIG. 1*b* is a plot of modulated carrier signal $\Phi$ at a given instant versus positive and negative elevation angles, $\pm\beta$; and FIG. 2 is a plot of modulation phase $\phi$ versus positive elevation angles for an ideal array of the type described in this invention having an infinite number of pairs of radiating elements and for an eleven element array described in one embodiment of this invention;

FIG. 3 depicts an embodiment of this invention including the eleven element antenna array with means for energizing the elements to produce a modulated radiation pattern having the characteristics described in FIGS. 1 and 2; and FIG. 4 is a block diagram of receiving equipment for use on board a craft to determine landing path elevation angle.

One method for creating a radiation pattern defining landing paths unaltered by changes in ground level and reflectivity is to impose a characteristic on the radiation which varies with elevation angle and is the same at equal positive and negative angles. Consequently, signals which reflect from the ground will not alter that characteristic upon combining with the directly radiated signals which do not reflect from the ground. If the characteristics imposed on the radiation by which elevation angles are to be defined is a modulation, and the phase of this modulation is to be representative of elevation angle, then the phase of modulation must vary with the absolute value of the elevation angle. When ground reflectivity varies in such a system, the modulation phase of the signal of any particular elevation angle which is contributed by reflection from the ground will be the same as the modulation phase of the directly radiated signal along that same elevation angle. Consequently, ground reflections will only alter the amplitude of radio frequency signals received by an aircraft, but they will not alter the information as represented by the modulation phase of the received signals.

Turning first to FIG. 1*a* there is shown a plot 1 of modulation phase $\phi$ versus elevation angle $\beta$ describing the preferred characteristics of a radiation pattern in accordance with this invention. The radiation is from a source, preferably near the ground, for guiding an aircraft to an instrument landing. As can be seen from FIG. 1*a*, curve 1 is essentially linear with absolute value of the elevation angle $\beta$. For example, each value of modulation phase $\phi$ is the same for the same value of $\beta$ whether positive or negative. Consequently, an expression for the modulation phase $\phi$ in terms of the elevation angle $\beta$ must be unaltered by a change in the sign of $\beta$ and modulation phase will be the same at equal elevation and deflection angles. In some prior systems in which modulation phase varies with elevation angle, that variation is continuous as shown by a dotted line 2 extending from one side of curve 1 and such prior systems do not produce equal modulation phases at equal elevation and deflection angles.

FIG. 1*b* shows plots of modulated carrier signal amplitude, $\Phi$, at a given instant versus elevation angles for comparing the preferred characteristics of this invention represented by curve 3, with some prior systems represented by broken line 4. Line 4 extends as a sinewave from one side of curve 3 just as line 2 extends from one side of curve 1.

In order to produce a pattern in which modulation phase varies essentially, as shown in curve 1 in FIG. 1, it is desirable that the modulated carrier signal $\Phi$ be expressed in terms of modulating rate $W_m$, carrier frequency rate $W_c$ and elevation angle $\beta$ as shown in Equation 1.

$$\Phi=[1+A\sin(W_mt\pm2K\beta+\Delta)]\sin W_ct \quad (1)$$

In Equation 1, A is an amplitude term that remains constant, K is a constant of proportionality relating elevation angle $\beta$ to modulation phase and $\Delta$ is a constant angle representing a given phase shift. Since the modulated carrier signal $\Phi$ expressed in Equation 1 must remain unaltered when the sign of $\beta$ changes, the term in Equation 1 containing $\beta$ is expanded as follows:

$$A\sin(W_mt\pm2K\beta+\Delta)=A\sin(W_mt+\Delta)\cos2K\beta \pm A\cos(W_mt+\Delta)\sin2K\beta \quad (2)$$

Now $\cos 2K\beta$ equals $\cos -2K\beta$; consequently the first terms in the right side of Equation 2 is the same whether $\beta$ is negative or positive and is therefore an even function. The second term in the right side of Equation 2 can be made an even function when appropriate signs are used and, therefore, it can be analyzed into a Fourier cosine series, denoted F $(K\beta)$, which satisfies the following conditions:

$$F(K\beta)=\sin 2K\beta \text{ when } K\beta>0 \quad (3)$$

$$F(K\beta)=0 \text{ when } K=0 \quad (4)$$

$$F(K\beta)=-\sin 2K\beta \text{ when } K\beta<0 \quad (5)$$

Such a Fourier series, $F(K\beta)$, is as follows:

$$F(K\beta)=\sum_{n=0}^{\infty}a_n\cos nK\beta \quad (6)$$

For this series the general coefficient, $a_n$, is as follows:

$$a_n=\frac{2}{\pi}\int_0^{\pi}F(K\beta)\cdot\cos nK\beta\cdot d(K\beta) \quad (7)$$

consequently $$a_n=\frac{2}{\pi}\int_0^{\pi}\sin 2K\beta\cdot\cos nK\beta\cdot d(K\beta) \quad (8)$$

$$a_n=\frac{-1}{\pi}\left[\frac{\cos(2-n)\pi-1}{2-n}+\frac{\cos(2+n)\pi-1}{2+n}\right] \quad (8a)$$

It is evident from Equation 8*a* that $a_0$ is zero and that $a_n$ is zero for all even values of $n$. Therefore, solving for odd values of $n$, the following are obtained:

$$a_1=\frac{8}{3\pi},\ a_3=\frac{-8}{5\pi},\ a_5=\frac{-8}{21\pi},\ a_7=\frac{-8}{45\pi},\ a_n=\frac{8}{\pi(4-n^2)} \quad (9)$$

and so forth to $n=\infty$.

The radiation pattern of Equation 1 has now been analyzed to the following form:

$$\Phi=\left[1+A\sin(W_mt+\Delta)\cos2K\beta + A\cos(W_mt+\Delta)\sum_{n}^{\infty}a_n\cos nK\beta\right]\sin W_ct \quad (10)$$

where $a_n$ has values as shown in Equation 9.

It can be approximated at small values of $\beta$, that $\sin\beta=\beta$. With this substitution, Equation 10 becomes $$\Phi=\left[1+A\sin(W_mt+\Delta)\cos(2K\sin\beta) + A\cos(W_mt+\Delta)\sum_{n=0}^{n=\infty}a_n\cos(nK\sin\beta)\right]\sin W_ct \quad (11)$$

Equation 11 can be expanded to include any number of values of $n$. Since this series converges rapidly a practical value of $n$ up to and including $n=7$ is chosen. When expanded, and the values for $a_n$ shown in Equations 9 are inserted, Equation 11 becomes as follows:

$$\left.\begin{aligned}\Phi=&\ \sin W_ct\\ &+A\sin(W_m+\Delta)[\cos(2K\sin\beta)\sin W_ct]\\ &+A\cos(W_m+\Delta)\frac{8}{3\pi}[\cos(K\sin\beta)\sin W_ct]\\ &-A\cos(W_m+\Delta)\frac{8}{5\pi}[\cos(3K\sin\beta)\sin W_ct]\\ &-A\cos(W_m+\Delta)\frac{8}{21\pi}[\cos(5K\sin\beta)\sin W_ct\\ &-A\cos(W_m+\Delta)\frac{8}{45\pi}[\cos(7K\sin\beta)\sin W_ct\end{aligned}\right\} \quad (12)$$

Employing the trigonometric identity $\sin x\cos y$ equals $\frac{1}{2}\sin(x+y)+\frac{1}{2}\sin(x-y)$ Equation 12 becomes as follows:

$$\Phi = \sin W_c t \quad (13a)$$
$$+A/2 \sin (W_m+\Delta) [\sin (W_c t+2K \sin \beta)+\sin (W_c t-2K \sin \beta)] \quad (13b)$$
$$+\frac{4A}{3\pi} \cos (W_m+\Delta) [\sin (W_c t+K \sin \beta)+\sin (W_c t-K \sin \beta)] \quad (13c)$$
$$-\frac{4A}{5\pi} \cos (W_m+\Delta) [\sin (W_c t+3K \sin \beta)+\sin (W_c t-3K \sin \beta)] \quad (13d)$$
$$-\frac{4A}{21\pi} \cos (W_m+\Delta) [\sin (W_c t+5K \sin \beta)+\sin (W_c t-5K \sin \beta)] \quad (13e)$$
$$-\frac{4A}{45\pi} \cos (W_m+\Delta) [\sin (W_c t+7K \sin \beta)+\sin (W_c t-7K \sin \beta) \quad (13f)$$
(13)

Turning next to FIG. 3 there is shown an arrangement of eleven antenna elements with means for energizing said elements to create a modulated pattern of radiation as expressed in Equation 13. It is obvious from the derivation of Equation 13 that many more terms could be included by expanding the expression to greater values of $n$. However, for the embodiment hereindescribed, the expansion will be made to $n=7$. An examination of the terms in Equation 13 which are denoted as terms (13*a*), (13*b*), (13*c*), (13*d*), (13*e*) and (13*f*) indicate that each of the terms except term 13*a* may be contributed by a different pair of antennas. It becomes further apparent that the constant K represents a unit distance of separation between the antennas in each pair. For example, term 13*b* could be contributed by a pair of antennas energized by a double sideband of the carrier rate $W_c$ modulated by the modulating rate $W_m$, the antennas of this pair separated by a distance represented by the quantity 2K. By the same reasoning, terms 13*c*, 13*d*, 13*e* and 13*f* may each be contributed by a different pair of antennas, the antennas of each pair separated by distances equivalent to K, 3K, 5K and 7K, respectively, and each of these pairs of antennas being energized by double sidebands of $W_c$ modulated by $W_m$ which is in quadrature with the modulation of the signal energizing the antenna pair contributing the term 13*b*. The amplitude of the double sideband signals energizing each of the different pairs of antennas are represented by the amplitude factors of each of the terms 13*b* to 13*f* relative to unity amplitude of term 13*a*.

If each of the different antenna pairs representing the different terms of Equation 13, as described above, are arranged vertically and symmetrically about a horizontal line and an additional antenna element is disposed in the vertical arrangement on the horizontal line, it can be assumed that the radiation from each pair of antennas emanates from the point in the array where the single element is located. Furthermore, if the single element is energized by carrier frequency to contribute the term 13*a* in Equation 13, the complete expression for the composite signal $\Phi$ as a function of elevation angle $\beta$ expressed by Equation 13 will be obtained.

In FIG. 3 there is shown eleven vertically disposed antenna elements arranged in five symmetrical pairs 5, 6, 7, 8 and 9 with a single antenna element 10 disposed in the same vertical arrangement on the line of symmetry between antennas of each pair. Antenna pairs 5, 6, 7 and 8 are coupled via attenuators 11, 12, 13 and 14 to line 15 which is energized by the output of carrier suppression double sideband modulator 16. While antenna pair 9 is coupled via attenuator 17 to line 18, and line 18 is energized from the output of another carrier suppression double sideband modulator 19. The central element 10 is coupled to the output of carrier signal generator 20 by a suitable delay circuit 21. The purpose of delay circuit 21 is to insure that the phase of carrier signal energizing element 10 is the same as the phase of carrier signal energizing antenna pairs 8 and 9. The transmission lines coupling line 15 through attenuators 11, 12 and 13 to antenna pairs 5, 6 and 7 have the same electrical length and this electrical length is also the same in the transmission line coupling antenna pair 9 to line 18. On the other hand, the transmission line coupling line 15 via attenuator 14 to antenna pair 8 has an electrical length which differs from the others by preferably one half a wavelength of carrier frequency.

The distance between the antennas of pairs 5, 6, 7 and 8 are related to each other as odd whole numbers, and the antennas of pair 9 are separated a distance twice that separating the closest spaced of the others. Consequently, if antennas of the pair which is closest to the line of symmetry are displaced a distance K from that line of symmetry, then the next closest pair must be displayed a distance 2K from the line of symmetry, the next 3K from the line of symmetry, the next 5K from the line of symmetry, the next 7K from the line of symmetry, etc. Attenuators 11 to 14 and 17 coupling energy to antenna pairs 5, 6, 7, 8 and 9, respectively, are such that they attenuate the double sideband signals from modulators 16 or 19 in proportion to the terms $$\frac{4A}{3\pi}, \frac{4A}{5\pi}, \frac{4A}{21\pi}, \frac{4A}{45\pi}, A/2$$

respectively, relative to the amplitude of carrier signal energizing antenna element 10.

In operation, carrier signal generator 20 and a modulating signal generator 22 apply signals to modulators 16 and 19, the signal from generator 22 being phase shifted 90° by phase shifter 23 before application to modulator 16. Modulators 16 and 19 may be similar to any of the well-known carrier suppression double sideband type modulators such as, for example, a balanced modulator as described on page 481 of "Radio Engineering" by Terman. The transmission lines coupling antenna pairs 5, 6 and 7 to line 15 preferably are 180 electrical degrees of carrier frequency longer than the line coupling antenna pair 8 to line 15. This is required to account for the negative signs on terms 13*d*, 13*e* and 13*f* which are contributed by radiation from antenna pairs 5, 6 and 7, respectively. As a result of the above arrangement of elements and method of energizing each element, a radiation pattern is generated as though originating from the point of location of element 10 and the amplitude of this radiation at a given instant is represented by curve 24 which varies with elevation angles $\beta$ above and below the line of symmetry 25. For example, in the embodiment described by FIG. 3, the modulation phase changes 90° with each increase of approximately 6½ degrees of elevation angle. In FIG. 2 there is shown a more precise plot of modulation phase $\phi$ versus positive elevation angles for the eleven element array, $n=7$, shown in FIG. 3. This plot is represented by the solid line in FIG. 2. The dashed line in FIG. 2 represents modulation phase versus elevation angle for an array having an infinite number of pairs of antennas for which $n$ approaches infinity. As can be seen from FIG. 2 the eleven element array follows the infinite array very closely over the most useful range of elevation angles. In order to provide a reference signal for phase comparison with modulation signals to establish the phase of modulation and thereby establish elevation angle, pulse generator 26, transmitter 27 and antenna 28 are provided which are preferably, but not necessarily, in the vicinity of the eleven element antenna. Pulse generator 26 generates pulses bearing a predetermined phase relationship to the signal from modulation signal generator 22 and these pulses serve to control the output of a reference signal transmitter 27 energizing radiating antenna 28. For example, the phase of the signal radiated by antenna 28 at the given instant for which curve 24 represents the amplitude of radiation as a function of elevation angle can be 0 or $\pi$ or $2\pi$ or other multiples of ½ a cycle of modulating frequency.

In FIG. 4 there is shown one form of receiving equipment for use on board an aircraft responsive to signals from the antenna system shown in FIG. 3 for determining landing path elevation angle. This receiving equipment might, for instance, be comprised of an antenna 29 feeding carrier frequency receiver 30 and reference frequency receiver 31. The output of receiver 30 is demodulated by demodulator 32 and the output of receiver 31 is detected by detector 33 which may be, for example, a circuit for detecting the phase of the reference signal. The signal from demodulator 32 is phase shifted by phase shifter 34 and phase compared in phase comparison circuit 35 with the output from detector 33. The output from circuit 35 energizes servo motor 36 which drives phase shifter 34 to null the output from circuit 35. Consequently, the rotor position of motor 36 represents glide slope and may be indicated on a suitable indicator 37.

Other antenna arrays having a given lesser number of elements could be substituted for the system shown in FIG. 3 without deviating from the spirit and scope of this invention. For example, two pair of symmetrical antennas could be employed energized by a single sideband in conjunction with the central element energized by carrier frequency. However, such an array would only provide for three of the terms in Equation 13 and a plot of modulation phase versus elevation angle for such an array would have poor linearity over most useful ranges of glide slope elevation angles. On the other hand, additional pairs of antenna elements could be added to the array shown in FIG. 3 to improve linearity over a greater range of elevation angles. Furthermore, each of the terms of Equation 13 could be generated by more than two antennas arranged in symmetrical manners with a single radiating element centrally located therebetween and energized by a carrier frequency. However, the embodiment described in this invention and shown in FIG. 3 is considered the most suitable for generating glide paths between 1° and approximately 30° as such a range of glide paths satisfies most of the demands of present day aircraft. The spirit and scope of this invention is set forth in the following claims.

We claim:

1. Glide path apparatus for an instrument landing system comprising radiation means including a plurality of radiating elements disposed vertically and energized by modulated carrier signals for producing a radiation pattern of modulated frequency carrier signals in which modulation phase above and below a reference plane varies in the same manner with the absolute value of elevation angle, a reference signal transmitter synchronized with said radiation means and energizing an antenna located in the reference plane, receiving means for detecting said modulation and said reference signal and phase comparing means coupled to said receiving means producing a signal indicative of glide path.

2. Apparatus as in claim 1, in which said elements are disposed symmetrically with respect to said reference plane at positions fixed relative to said plane.

3. In glide path apparatus for an instrument landing system employing a ground beacon, at least one pair of antennas disposed symmetrically-relative to a reference plane and energized by a modulated carrier signal and an antenna element energized by carrier signals and located in the reference plane, the beacon producing a radiation pattern of modulated carrier frequency signals in which modulation phase above and below said reference plane varies in the same manner with the absolute value of elevation angle.

4. In glide path apparatus for an instrument landing system, a beacon comprising a plurality of pairs of antennas symmetrically disposed about a horizontal plane, each pair energized by a single sideband of modulated carrier signals and an antenna element energized by carrier signals and located in said horizontal plane between the antennas of at least one of said pairs, the beacon producing a radiation pattern of modulated carrier frequency signal in which modulation phase at angles above and below said horizontal plane vary in the same manner with the absolute value of said angles.

5. In glide path apparatus for an instrument landing system, a beacon comprising a plurality of pairs of antennas vertically disposed about a common point in a horizontal plane, each pair energized by a different modulated carrier frequency signal and an antenna element located at said point and energized by carrier frequency signal, the beacon producing a radiation pattern of modulating carrier frequency signal in which modulation phase is the same at equal angles above and below said horizontal plane and in which said phase varies linearly with the absolute value of said angles.

6. A glide path beacon comprising a plurality of pairs of antennas symmetrically disposed about a common plane, the distance between antennas of each pair being odd multiples of the distance between antennas of the closest spaced pair and one pair of said antennas being spaced a distance twice the distance between the closest spaced pair, a carrier signal generator, a modulating signal generator, a first balanced modulator, a second balanced modulator, means coupling said carrier signal generator and said modulating signal generator to said first modulator, means coupling said carrier signal generator to said second modulator, phase shifting means coupling said modulating signal generator to said second modulator, attenuating means coupling the output of said second modulator to said antenna pairs spaced at odd multiples, attenuating means coupling the output of said first modulator to said antenna pair spaced at twice the distance of the most closely spaced antenna pair, means coupling the output of said second modulator to said most closely spaced antenna pair whereby said most closely spaced pair are energized by a signal of opposite phase to the signal energizing antenna pairs spaced at odd multiples and an antenna element located between said plurality of pairs on said common plane and coupled to the output of said carrier signal generator, said beacon producing a radiation pattern of modulated carrier signal in which modulation phase at angles above and below said common plane vary linearly with the absolute value of said angle.

References Cited in the file of this patent

UNITED STATES PATENTS

| | | |
|---|---|---|
| 2,379,442 | Kandoian | July 3, 1945 |
| 2,664,560 | Lyman et al. | Dec. 29, 1953 |
| 2,771,603 | Pickles et al. | Nov. 20, 1956 |